(12) United States Patent
Terashima

(10) Patent No.: US 6,675,505 B2
(45) Date of Patent: Jan. 13, 2004

(54) GOLF SHOE CLEAT

(75) Inventor: Yasuyuki Terashima, Aichi (JP)

(73) Assignee: Japana Co., Ltd., Aichi (JP)

( * ) Notice: Subject to any disclaimer, the term of this patent is extended or adjusted under 35 U.S.C. 154(b) by 0 days.

(21) Appl. No.: 10/181,512

(22) PCT Filed: Jan. 4, 2001

(86) PCT No.: PCT/JP01/00012

§ 371 (c)(1),
(2), (4) Date: Nov. 13, 2002

(87) PCT Pub. No.: WO01/54527

PCT Pub. Date: Aug. 2, 2001

(65) Prior Publication Data

US 2003/0131502 A1 Jul. 17, 2003

(30) Foreign Application Priority Data

Jan. 24, 2000 (JP) .................................... 2000-014944
Feb. 1, 2000 (JP) .................................... 2000-024036

(51) Int. Cl.[7] ............................................. A43C 15/16
(52) U.S. Cl. ........................................... 36/134; 36/127
(58) Field of Search ................. 36/134, 67 R, 36/67 A, 67 B, 67 D, 59 A, 127; D2/962

(56) References Cited

U.S. PATENT DOCUMENTS

| | | | |
|---|---|---|---|
| 5,794,367 A | | 8/1998 | Carroll |
| 5,887,371 A | | 3/1999 | Curley, Jr. |
| D440,750 S | * | 4/2001 | Waterbury .................... D2/962 |
| D452,947 S | * | 1/2002 | Terashima .................... D2/962 |
| 6,338,208 B1 | * | 1/2002 | Waterbury .................... 36/134 |
| D473,699 S | * | 4/2003 | Savoie ......................... D2/962 |

FOREIGN PATENT DOCUMENTS

| | | |
|---|---|---|
| DE | 1 962 430 | 6/1967 |
| EP | 0 922 401 A1 | 6/1999 |
| GB | 2 322 787 A | 9/1998 |
| JP | 3151193 | 1/2001 |

* cited by examiner

Primary Examiner—Ted Kavanaugh
(74) Attorney, Agent, or Firm—Adams Evans P.A.

(57) ABSTRACT

A plastic cleat (10) for a golf shoe is disclosed, including a cleat body (3), a plurality of flexible protrusions (1) and rigid protrusions (2) extending from the cleat body (3). The flexible protrusions (1) and rigid protrusions (2) provide good grips on grass without damaging the grass. The flexible protrusions (1) bend outwardly on a hard surface, when the rigid protrusions (2) chiefly support weight. The cleat (10) can be economically manufactured by "forced extraction molding" utilizing the shape rebounding nature of half hardened plastic materials.

9 Claims, 14 Drawing Sheets

GOLF SHOE CLEAT

BACKGROUND OF THE INVENTION

This application is a 371 of PCT/JP01/00012 filed on Jan. 4th, 2001.

1. Field of the Invention

This invention generally relates to a cleat. More particularly, this invention relates to a cleat to be used on golf shoes. This invention also relates to a method for manufacturing plastic golf shoe cleats.

2. Related Art

Pushpin type metallic spikes or cleats are conventionally used on golf shoes. Some are integrally provided and some are detachably provided on golf shoe soles. Such metallic spikes generally provide satisfactory grips or bites on grass or turf on the golf courses even when the grass or turf is wet.

Good grips and bites are provided because relatively long metallic spikes penetrate deep through grass into the ground beneath the grass, which is often damaging to the grass by the roots. The golfing ground will also get considerably roughened by metallic spikes. This problem is multiplied on putting greens. Subsequent players are often troubled by roughened putting greens. In addition, sharp metallic spikes can damage floor tiles or carpets of clubhouses.

Sharp pushpin type metallic spikes are not very comfortable to walk on, either, especially on hard surfaces such as floors or pavements.

Metallic spikes do not provide stability to wearers due mainly to a limited number of contact points with grounds and hardness of the contact points that contact grounds. Wearers of spiked shoes may easily lose body balance on hard surfaces particularly when the surfaces are wet or slippery. Metallic spikes may hurt wearers' feet, knees or waists as the shocks from the physical contacts between the metallic spikes and hard grounds can be directly transmitted to the wearers' feet because metallic spikes do not absorb such shocks.

In order to solve or alleviate the foregoing problems which are intrinsic to metallic spikes, nonmetallic types of spikes or cleats have been developed. They are mostly manufactured of plastic materials. Such plastic cleats have protrusions which are generally shorter than conventional metallic spikes and provide wearers with improved comfort since such cleats absorb shocks from hard surfaces to a certain degree. They also provide improved stability because they are shorter and a larger number of contact points are provided on shoe soles than with conventional metallic spikes. Plastic cleats do not damage turf or floors or carpets of clubhouses, unlike metallic spikes.

However, such conventional plastic cleats do not generally provide as good grips or bites on grass or turf as metallic spikes do. Providing good grips on grass is what is expected of cleats and spikes. Conventional plastic cleats often fail to provide grips on wet grass, withered grass or slopes.

JP Patent Laid-Open Publication No. 11-262401 teaches a plastic cleat 30, which is shown in FIGS. 12 and 13 of the drawings which are attached to this specification. This conventional plastic cleat 30 includes a threaded shaft 31 and a plurality of legs 32 as shown. The threaded shaft 31 is screwed into a threaded receptacle provided on a golf shoe sole. The legs 32 are made structurally flexible.

A plurality of plastic cleats 30 are secured on a shoe sole. They hardly damage grass or floors or carpets of clubhouses. However, since the legs 32 cannot effectively sustain wearers' weights due to the intrinsic weakness generated from the design features thereof, the legs 32 easily open outwardly as shown in FIG. 14 and lose grips on turf. Wearers do not necessarily get comfortable feelings on hard surfaces because of the "unique softness" the legs 32 provide as they are deformed. The cleats 30 do not provide good abrasion resistance, either, and they wear out rapidly. It may be possible to provide the legs 32 with more rigidity, however, then the cleats 30 will damage putting greens, more or less.

Accordingly, it is an object of the present invention to provide an improved cleat for golf shoes that is abrasion resistant and durable.

It is another object of the present invention to provide an improved cleat for golf shoes that provides good grips and bites on grass.

It is another object of the present invention to provide an improved cleat for golf shoes that can effectively absorb physical shocks from hard surfaces and is excellent in stability on hard surfaces.

It is yet another object of the present invention to provide an improved cleat that does not damage turf or floors of clubhouses.

It is still another object of the present invention to provide an improved cleat for golf shoes that indicates progress of abrasion.

It is yet another object of the present invention to provide an economical method of manufacture of such improved cleats.

Other objects of the present invention will become apparent from the following descriptions.

SUMMARY OF THE INVENTION

The present invention is summarized here utilizing the claimed features that accompany this specification with the aim of facilitating the readers' easy understanding of the present invention.

An important aspect of the present invention is that a cleat of the invention which is advantageously made of a plastic material comprises a plurality of flexible protrusions and a plurality of rigid protrusions, wherein the flexible protrusions are generally provided longer than the rigid protrusions. Generally a plurality of such flexible protrusions and rigid protrusions are provided on a cleat along the periphery of the cleat.

A cleat 10 according to a claim includes a cleat body 3 from which a plurality of flexible protrusions 1 and a plurality of rigid protrusions 2 extend downwardly and generally obliquely outwardly. It is to be noted that the direction "downward" indicates a downward direction of the accompanying drawings, which is a direction toward grass or a ground when the cleat is in use.

The flexible protrusion 1 is "flexible", however, it is so designed that it hardly bends on grass or turf and penetrates into grass and provides an excellent grip, but bends outwardly or opens on a hard surface such as a pavement and effectively absorbs shocks from the hard surface so as to alleviate potential physical damages.

The rigid protrusion 2 is generally made somewhat shorter than the flexible protrusion 1. The rigid protrusion 2 as its name suggests is so made that it does not bend even on a hard surface. When the flexible protrusions 1 bend and open further outwardly, decreasing their vertical height and their weight supporting power, the rigid protrusions 2 support the remaining weight resting thereon. It is to be noted that the bent flexible protrusions 1 still support part of the weight.

The rigid protrusions 2 assist in providing good grips and bites on grass or turf by pressing grass hard from above. The rigid protrusions 2 prevent excessive deformation and abrasion of the flexible protrusions 1 on a hard surface.

The cleat body 3 is secured onto a golf shoe sole with securing means 4. The overall configuration of the cleat body 3 may be a circle, oval, triangle, square or any other polygonal shape. It is also possible to integrally and directly provide a plurality of cleats 10 or cleat bodies 3 (without securing means 4) on a shoe sole.

The cleat 10 may be made of a synthetic rubber material, ABS material, polycarbonate material, nylon material or a polyurethane material or any other appropriate plastic material or non-plastic material. Polyurethane materials are preferred materials.

It may be possible to provide each of the cleat body 3, flexible protrusion 1 and rigid protrusion 2 with different plastic materials to provide a compound-type cleat 10. The flexible protrusion 1 may be made of a flexible material and the rigid protrusion 2 may be made of a rigid material. Appropriate soft metallic materials or ceramic materials may be utilized, at least partially.

In an example cleat 10, four flexible protrusions 1 and four rigid protrusions 2 are provided alternately along the periphery of the cleat body 3.

It is possible to control directions of grips or bites by appropriately selecting the protrusion angles and/or shapes and/or dimensions and/or number of the flexible protrusions 1 and the rigid protrusions 2. For example, gripping power may be provided relatively larger in the directions "A" and relatively smaller in the directions "B" shown in FIG. 5.

Excellent directional grips and bites on turf or grass can be provided with a "small" number of cleats 10 by most appropriately positioning and orienting such cleats 10 on a shoe sole.

The number of flexible protrusions 1 and that of rigid protrusions 2 to be used on a single cleat 10 can be different from each other. For example, two flexible protrusions 1 may be provided between two rigid protrusions 2. It is to be noted that the wording "alternate" arrangement of the flexible protrusions 1 and the rigid protrusions 2 as used in this specification including the attached claims includes arrangements of the protrusions 1 and 2 which are different from each other in number.

The dimensions, angles, shapes, hardness or softness, number and positioning and orientation as well as materials of the protrusions 1 and 2 are factors to be adequately selected in accordance with expected performances and properties of the cleat 10.

The flexible protrusions 1 may be arranged on a cleat body 3 at different intervals. The rigid protrusions 2 may also be arranged on a cleat body 3 at different intervals among flexible protrusions 1.

The cleat 10 provides good grips and bites on turf, where neither flexible protrusions 1 nor rigid protrusions 2 bend. Both flexible and rigid protrusions 1 and 2 adequately tangle with grass blades and stalks. The cleat 10 stably supports weight resting thereon on a hard surface with the bent flexible protrusions 1 and the rigid protrusions 2.

A cleat 10 according to another claim has its flexible protrusions 1 widely opened outwardly or rather radially, providing larger voids between the flexible protrusions 1 and the rigid protrusions 2 than the corresponding voids of the cleat according to the foregoing claim. The large voids effectively prevent their stuffing with mud or grass pieces. Such flexible protrusions 1 will more easily bend outwardly on a hard surface in use.

Those "radially" opened flexible protrusions 1 provide improved cushioning effects on hard surfaces as well as securely provide grips and bites on turf because the voids between the flexible protrusions 1 and the rigid protrusions 2 hardly get stuffed with mud or grass pieces.

A cleat 10 according to another claim is made detachable from a shoe sole, facilitating renewal of worn-out cleats 10.

In a cleat 10 according to yet another claim, securing means 4 provides the attachment and detachment of the cleat of the above claim onto and from a shoe sole.

The securing means 4 may comprise engagement protrusions 7 as shown in FIG. 2 or thread means as shown in FIG. 3. Any appropriate conventional engagement means can be equally utilized. A metallic pin may be incorporated in the securing means 4 for reinforcement of the securing means 4 and its engagement. The cleat 10 can be easily attached on and detached from a shoe sole for replacement with a new one.

A cleat 10 according to another claim additionally includes a central protrusion 5 on the bottom side of the cleat body 3, which is generally as tall as the rigid protrusion 2 or slightly shorter. The central protrusion 5 supports weight on hard surfaces when the rigid protrusions 2 are worn out. The central protrusion 5 will provide improved stability on hard surfaces. However, use of the central protrusion 5 is optionally decided according to the present invention.

Each rigid protrusion 2 of the cleat 10 according to another claim has a through groove 6 on its free end portion as an indicator of the degree of wear of the rigid protrusions 2, which functions like "slip marks" of car tires. Such grooves 6 provide additional grips and bites on grass as well.

A plastic cleat 10 according to another claim has its flexible protrusions 1 and rigid protrusions 2 opened outwardly to a degree within the limit that facilitates utilization of "forced extraction molding" of the present invention. "Forced extraction molding" as used herein signifies "forced push out" of an injected plastic material from an injection mold before the injected material completely hardens in the mold. The processes are schematically depicted in FIG. 7. The injection mold has an extraction opening which is "narrower" than the widest portion of the designed cleat.

The forced extraction molding as used herein can only be performed within the limit that the forcedly extracted material from the mold through the narrow opening can rebound and exactly return to its designed shape before it completely hardens outside the mold. It is not possible to push a designed material out of a mold having a "narrow" extraction opening after the injected material has completely hardened within the mold.

The extracted material or cleat 10 eventually rebounds and returns to its designed shape and hardens exactly as designed. If the difference in size between the narrow extraction opening and the widest internal portion of a mold is excessive, the forced extraction molding of the present invention cannot be adequately utilized.

The cleat 10 is provided with comparatively large voids between its protrusions 1 and 2 so as to facilitate utilization of "forced extraction molding" of the present invention. The flexible protrusions 1 and rigid protrusions 2 are "wide" apart. Therefore, the flexible protrusions 1 and the rigid protrusions 2 can easily "close in" or deform themselves inwardly and can slip through the small extraction opening of the mold when they are half hardened. The protrusions 1 and 2 of the cleat 10 can therefore be made of a relatively more rigid material.

A method for producing a plastic cleat 10 for golf shoes according to the present invention is claimed, comprising preparing an appropriate mold having a "narrow" extraction opening for an appropriately designed cleat 10 including a cleat body 3 and a plurality of flexible protrusions 1 and rigid protrusions 2 generally alternately provided on the cleat body 3 along its periphery. The flexible protrusions 1 are opened outwardly such that they can regain their designed overall configurations after "forced extraction" from the mold. An appropriate plastic material is injected into the mold and is let to get half hardened in the mold. The material is then forcedly pushed with pin means out of the mold through the narrow opening and is left outside the mold to completely get hardened, when the extracted material naturally rebounds and regains the originally designed shape.

The "forced extraction" steps may be more easily conducted if there are provided large voids between the flexible protrusions 1 and the rigid protrusions 2. Through grooves 6 will further assist the forced extraction.

The angle of the flexible protrusion 1 relative to a horizontal plane (or a shoe sole) is adequately between 45 and 90 degrees. An angle of about 67 degrees (66.9 to be exact) is a preferred angle.

An advantage of "forced extraction molding" is that this method sufficiently lowers production costs by reducing the costs for preparing molds because such molds can be simply designed and made easily as will be readily appreciated by persons skilled in the molding art. The molding processes are also simple.

Tests and experience show that the cleats 10 of the present invention are capable of providing grips and bites on grass or turf that are comparable to conventional metallic spikes when an appropriate number of the cleats 10 are fixedly mounted on a shoe sole.

The tests were carried out on an artificial turf by measuring required horizontal forces to move a plurality of cleats 10 prepared according to an embodiment of the present invention and conventional metallic spikes, both of which were respectively mounted on the bottom side of heavy metallic plates.

Abrasion tests were also carried out, where cleats 10 made according to an embodiment of the present invention and conventional plastic cleats were placed on a sandpaper and each was loaded with a weight (1 kg) and drawn in a shape of "8" on the sandpaper. The test results showed that the cleats 10 of the present invention are more resistant to abrasion than the conventional plastic cleats.

The cleats of the present invention do not damage grass or floors, provide good abrasion resistance and good grips, adequately absorb physical shocks from hard surfaces, and provide good stability on hard surfaces.

The cleats of the present invention can be easily mass-produced from a plastic material at low costs as they can be produced utilizing the "forced extraction molding" which utilizes economical molds and processing.

DETAILED DESCRIPTION OF PREFERRED EMBODIMENT

Figure 1:
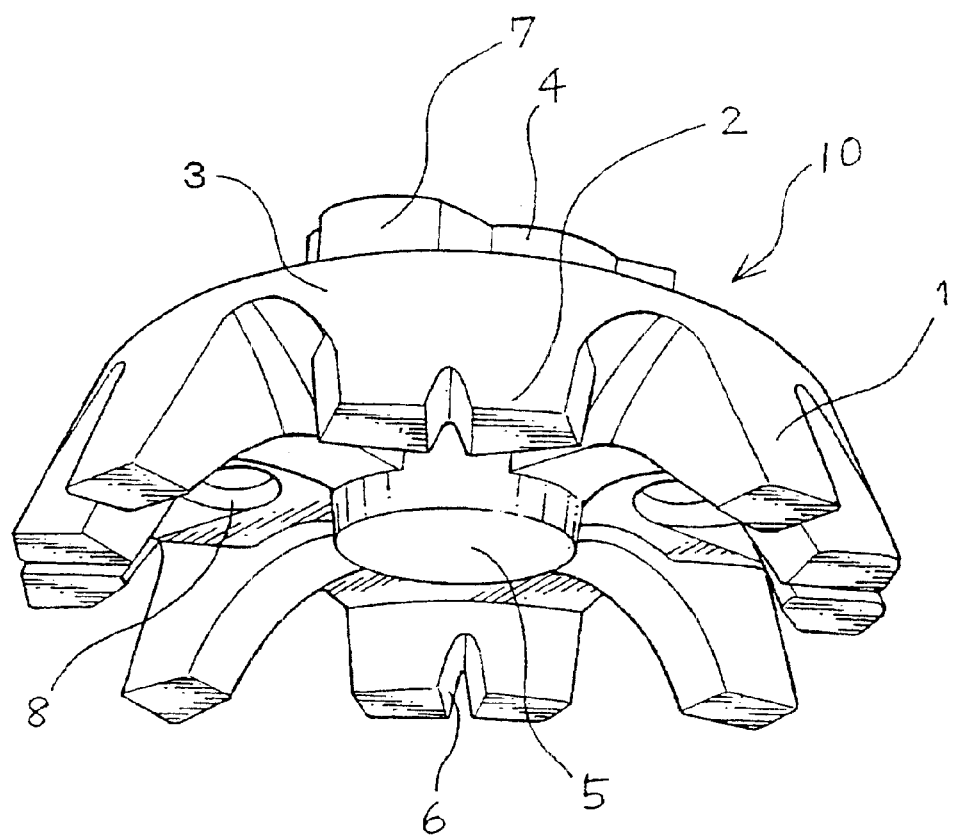
FIG. 1 is a perspective view of a cleat 10 according to an embodiment of the present invention.
Figure 2:
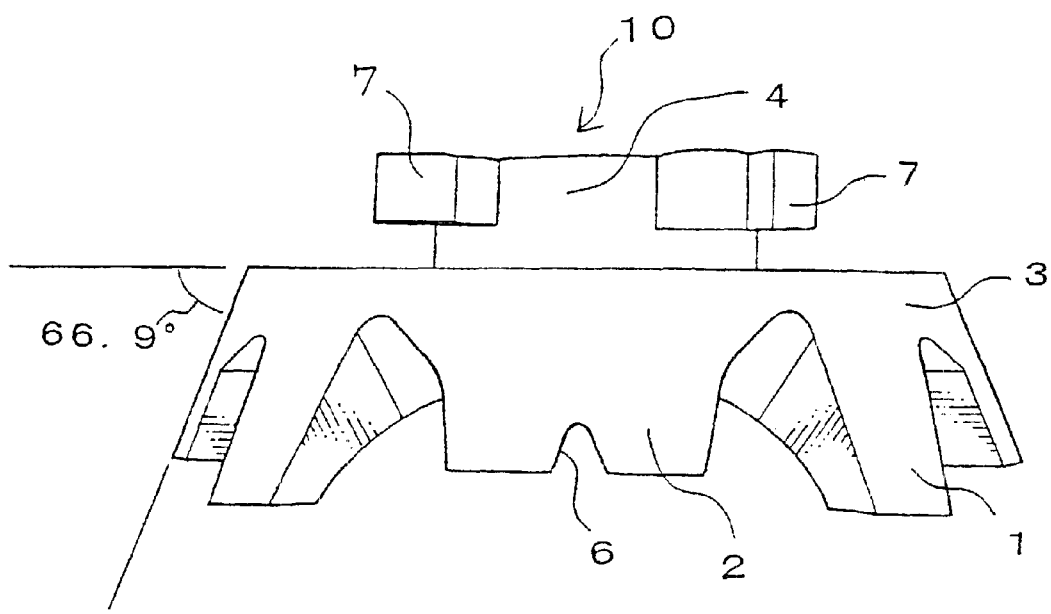
FIG. 2 is a side elevational view of the cleat 10 shown in FIG. 1.
Figure 3:
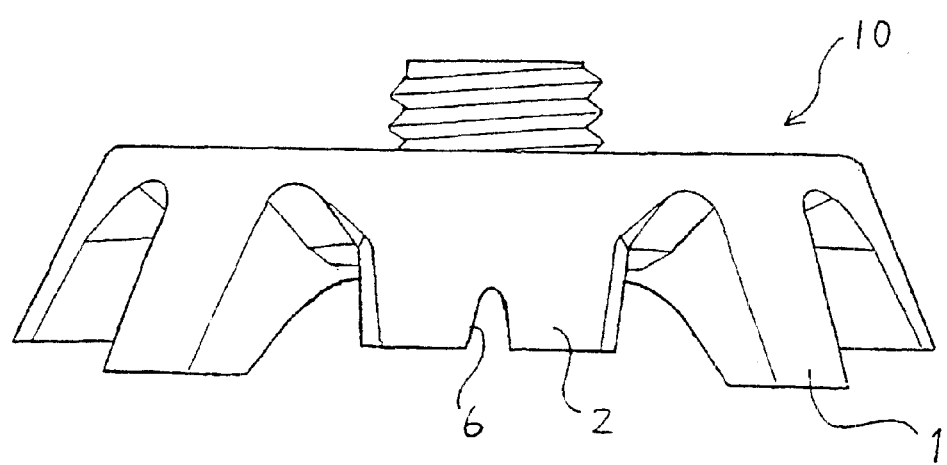
FIG. 3 is a side elevational view of a cleat 10 having threaded securing means 4 according to another embodiment of the present invention.
Figure 4:
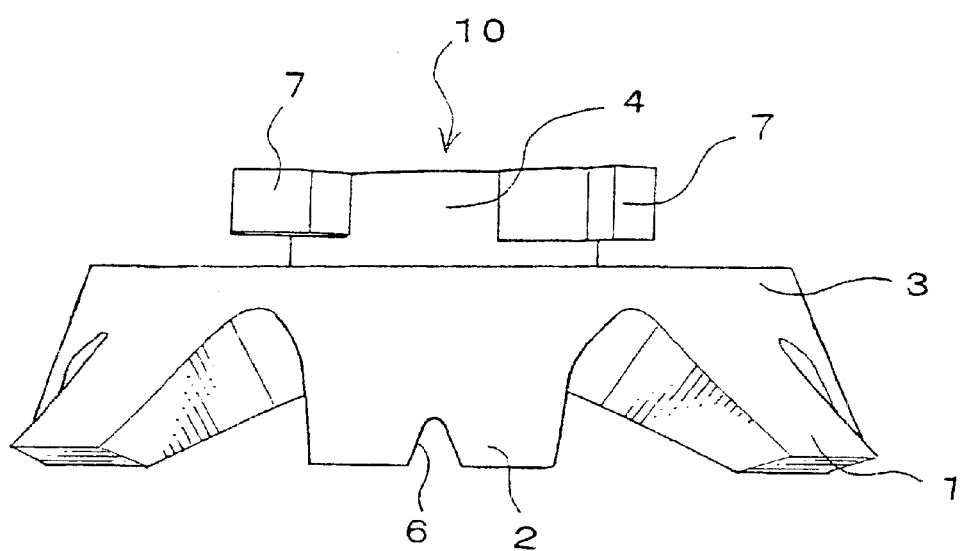
FIG. 4 is a side elevational view of the cleat 10 shown in FIG. 2, showing an example of deformation.
Figure 5:
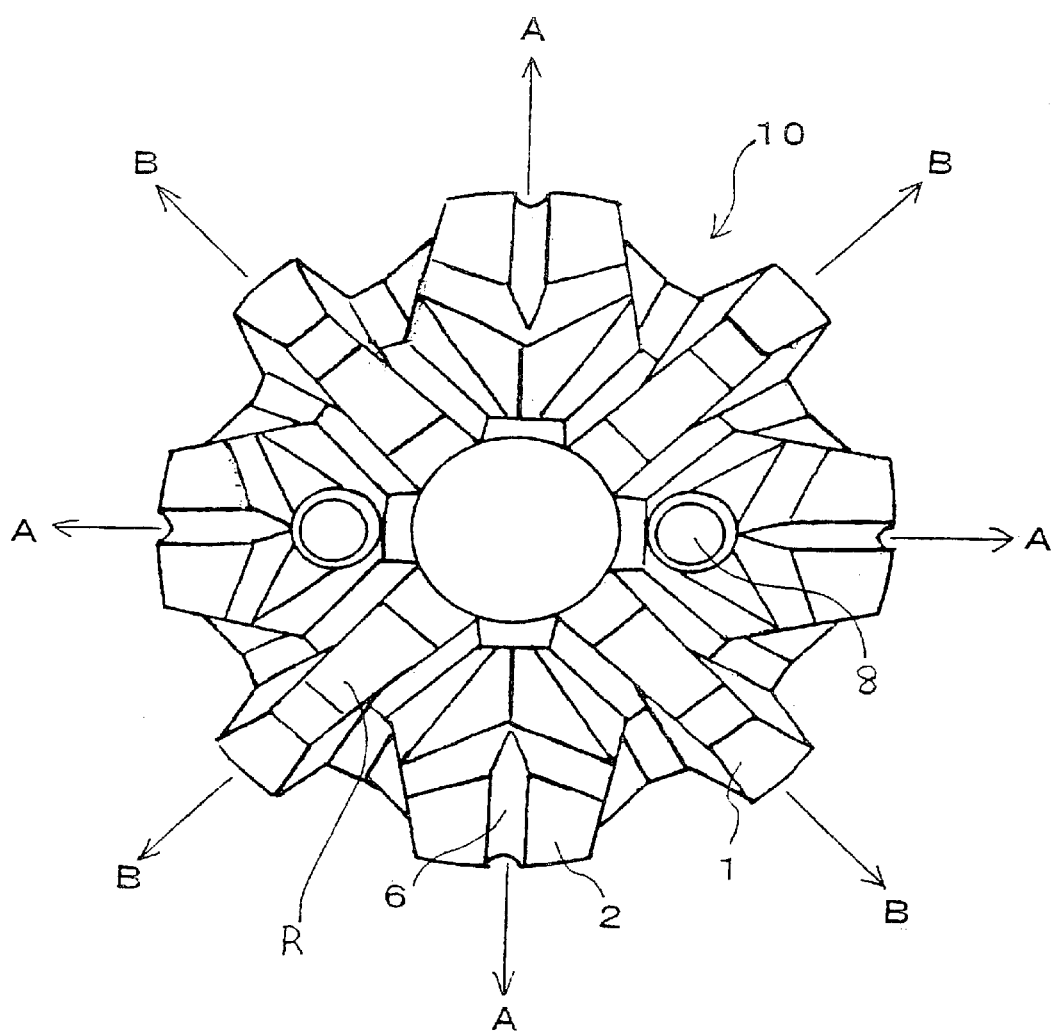
FIG. 5 is a bottom view of the cleat 10 shown in FIG. 1.
Figure 6:
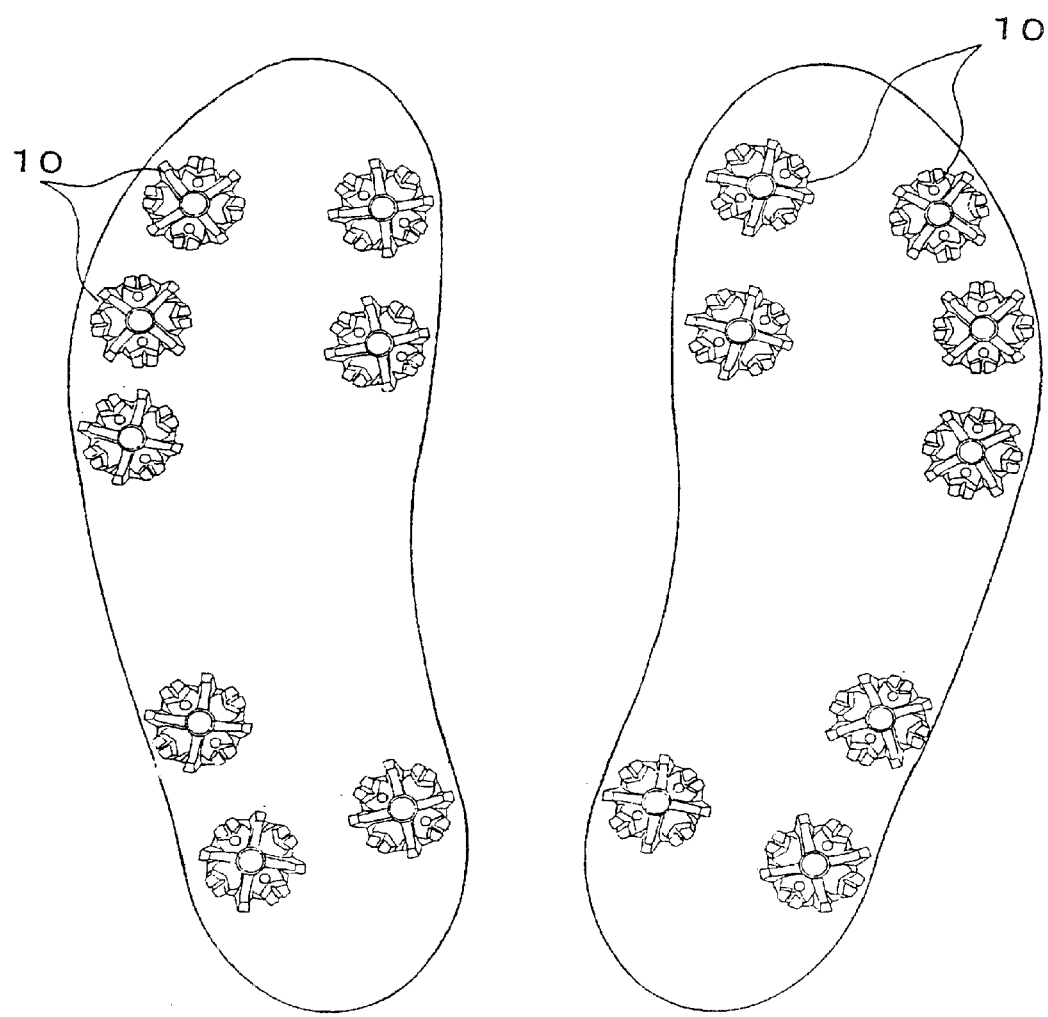
FIG. 6 is a bottom view showing an exemplary utilization of the cleat 10 of FIG. 1 on shoe soles.
Figure 7:
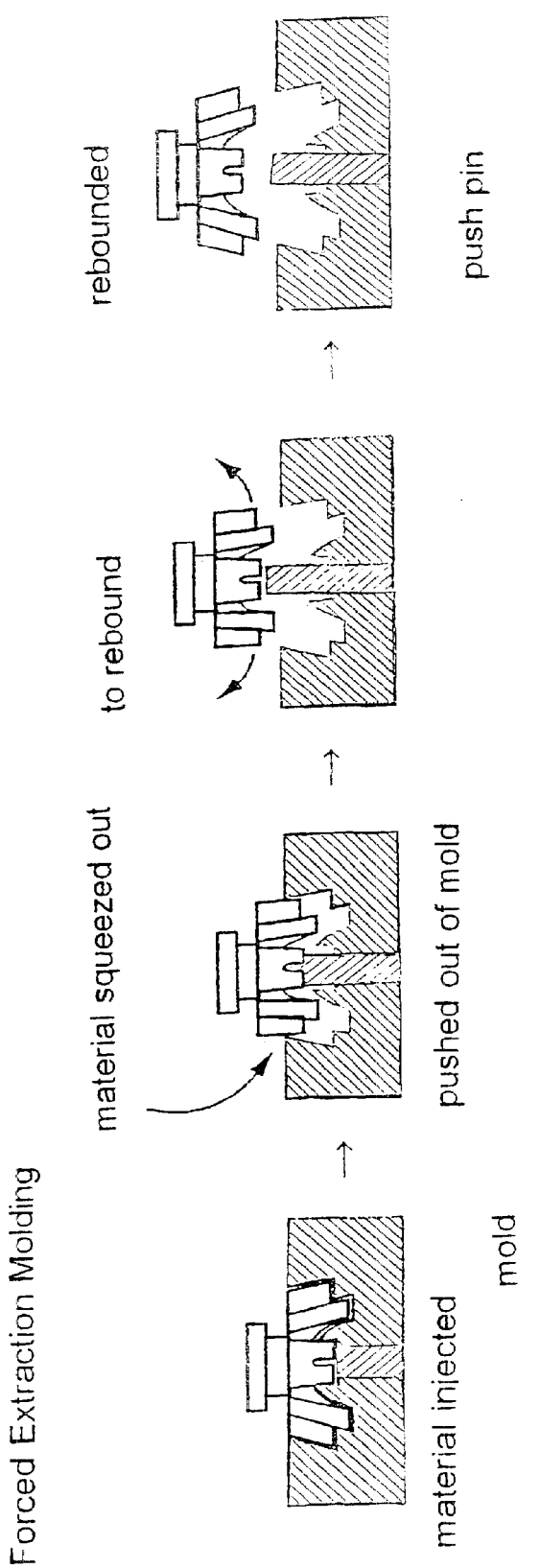
FIG. 7 shows manufacturing processes of cleats 10 according to "forced extraction molding" of the present invention.

In FIG. 1 is shown a plastic cleat 10 according to an embodiment (No. 1) of the present invention. The cleat 10 is integrally injection molded with a polyurethane material by "forced extraction molding" of the present invention. The cleat 10 comprises a circular cleat body 3, securing means 4, four flexible protrusions 1 and four rigid protrusions 2. Protrusions 1 and 2 are alternately provided on the periphery of the cleat body 3. The cleat 10 further comprises a circular central protrusion 5 provided on the cleat body 3.

It is to be noted that it is within the scope of the present invention to provide more flexible protrusions 1 than rigid protrusions 2 on a cleat body 3 and arrange them "alternately" on the cleat body 3 meaning more than one flexible protrusions 1 can be arranged between any two rigid protrusions, or less flexible protrusions than rigid protrusions 2 and arrange them "alternately", meaning at least one pair of adjacent rigid protrusions 2 do not flank any flexible protrusion 1.

It is to be additionally noted that while a number of flexible protrusions 1 and a number of rigid protrusions 2 may be advantageously arranged along the periphery of a cleat 3, it is within the purview of the present invention to provide the protrusions 1 and 2 off the periphery of the cleat body 3.

The cleat 10 is to be secured at a receptacle (not shown) of a shoe sole (not shown) by means of the securing means 4 having three engagement protrusions 7. In this embodiment, the securing means 4 is a short column-like protrusion and the engagement protrusions 7 engage corresponding receptacle grooves (not shown) provided inside the receptacle. There are provided two engagement indentations 8 on the bottom side of the cleat body 3 to be utilized in the engagement step. Handle means (not shown) engages with the engagement indentations 8 and turns the cleat 10 on the receptacle so that the engagement protrusions 7 are firmly secured in the reception. The securing means 4 can be metallically reinforced.

Each flexible protrusion 1 is provided such that the flexible protrusion 1 substantially retains its shape on grass but bends outwardly on a hard surface to substantially become even in vertical height with the rigid protrusion 2.

The rigid protrusion 2 is shorter and thicker, thus more resistant to deformation, than the flexible protrusion 1. The rigid protrusions 2 hold weight resting thereon when the flexible protrusions 1 are deformed and decrease their vertical height (while supporting part of the weight). Each rigid protrusion 2 has a through groove 6 extending in a diametrical direction, which can indicate appropriate replacement time.

The central protrusion 5 has a height roughly commensurate with the height of the deepest point of the through groove 6 (as measured from the bottom side of the cleat body 3).

The flexible protrusions 1 penetrate through grass or turf while the rigid protrusions 2 press the grass hard from above. The protrusions 1 and 2 both adequately tangle with the grass blades and stalks and provide good grips and bites. The grass will not be damaged because the penetration by the flexible protrusions 1 into the ground under the grass is kept minimum, if any. Carpets will not be damaged, either.

There are wide voids provided between the flexible protrusions 1 and rigid protrusions 2, adequately preventing clogging with cut grass blades or mud. Thus, satisfactory grips or bites are constantly and securely provided.

The flexible protrusions 1 will provide good cushioning effects on hard surfaces. When used on a hard surface, the flexible protrusions 1 gently and comfortably absorb physical shocks from the hard surface. Such cleats 10 will provide stability on a hard surface as well because there are provided an adequate number of contact points with the hard surface.

Figure 8:
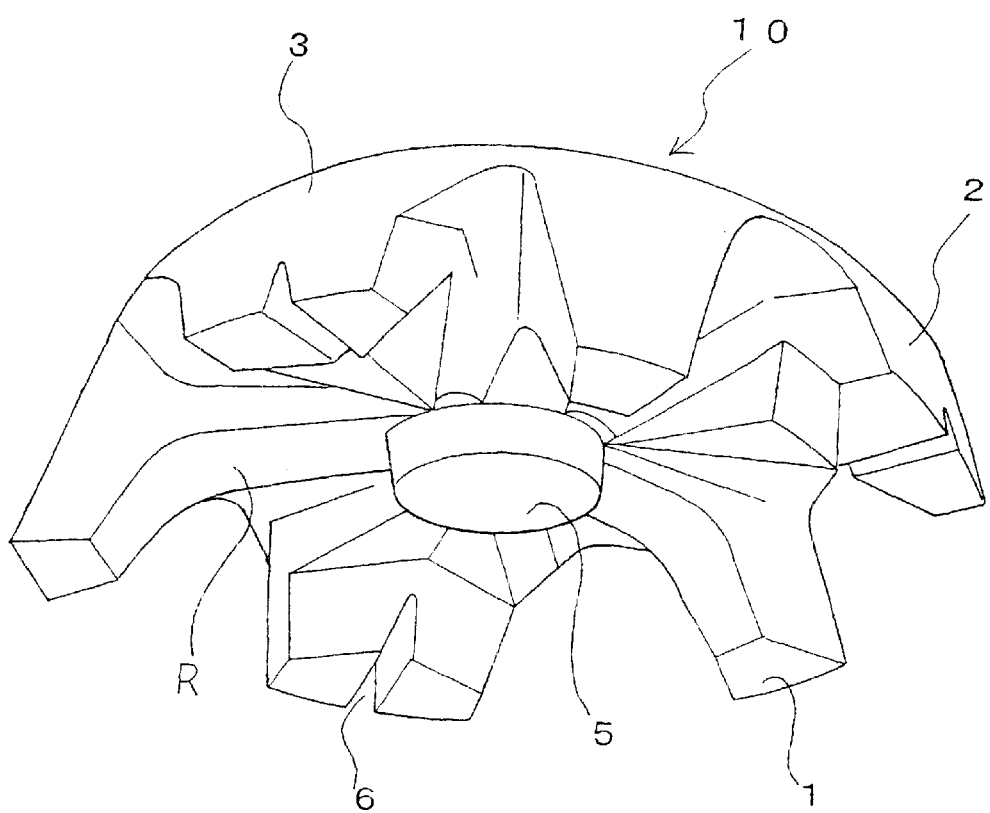
FIG. 8 is a perspective view of a cleat 10 according to another embodiment (No. 2) of the present invention.

In FIG. 8 is shown a plastic cleat 10 according to another embodiment (No. 2) of the present invention. The cleat 10 is integrally provided from a polyurethane material by "forced extraction molding." The cleat 10 comprises around cleat body 3, securing means 4 (not shown), three flexible protrusions 1 and three rigid protrusions 2. Protrusions 1 and 2 are alternately provided on the periphery of the cleat body 3. The cleat 10 further comprises a central protrusion 5.

The cleat 10 can be secured to a receptacle (not shown) of a shoe sole (not shown) by means of the securing means 4 having engagement protrusions 7 (not shown) just as described in connection with the foregoing embodiment. There are also provided two engagement indentations 8 on the bottom side of the cleat body 3. Handle means (not shown) engages the engagement indentations 8 and is turned so that the engagement protrusions 7 firmly engage the receptacle. The securing means 4 is reinforced with metallic means.

The securing means 4 may be receptacle means to receive protrusion means provided on a shoe sole, and the engagement protrusions 7 may be engagement receptacle means to receive engagement protrusions provided on the protrusion means.

The flexible protrusion 1 is designed such that the flexible protrusion 1 does not bend on grass or turf but bends outwardly on a hard surface to become practically even in vertical height with the rigid protrusion 2.

The rigid protrusion 2 is designed shorter and thicker, thus more resistant to deformation, than the flexible protrusion 1. The rigid protrusions 2 are capable of holding weight resting thereon on a hard surface without bending. Each rigid protrusion 2 in this embodiment has a through groove 6 extending in a diametrical direction, which can indicate appropriate time for replacement of the cleat 10.

The central protrusion 5 has a height roughly commensurate with the vertical height of the deepest point of the through groove 6.

The flexible protrusions 1 penetrate through grass and the rigid protrusions 2 press grass hard from above. The protrusions 1 and 2 effectively tangle with grass blades and stalks and provide good grips and bites on the grass. The grass will not be damaged because the penetration by the flexible protrusions 1 into the ground under the grass is kept minimum, if any.

There are larger voids created between the flexible protrusions 1 and the rigid protrusions 2 than the corresponding voids of the previous embodiment, more effectively preventing clogging with cut grass blades or mud.

Production of this type of plastic cleat 10 is easier than the production of the foregoing type of cleat because the wider voids between the protrusions 1 and 2 of this cleat 10 facilitate easier extraction of an injected material from a mold through its "narrow" extraction opening.

Figure 9:
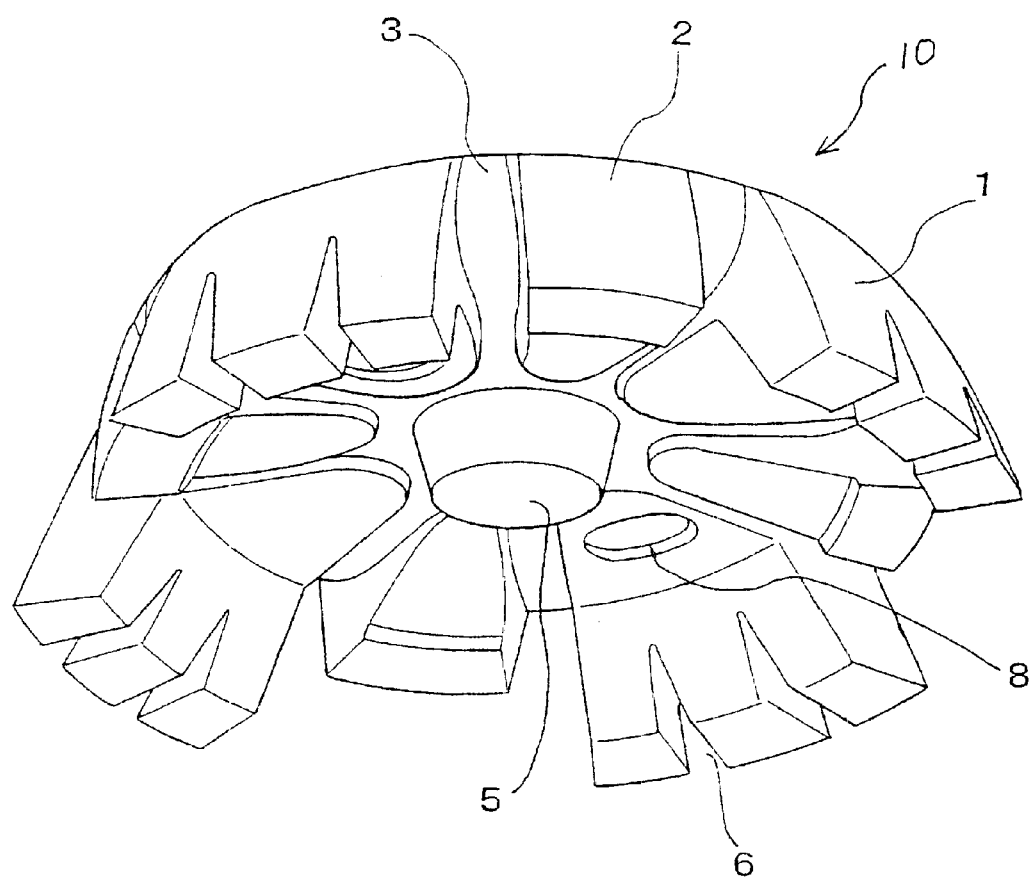
FIG. 9 is a perspective view of a cleat 10 according to another embodiment (No. 3) of the present invention.

In FIG. 9 is shown another embodiment (No. 3) of plastic cleat 10, comprising a round cleat body 3 having securing means 4 (not shown) with engagement protrusions 7 (not shown), four flexible protrusions 1 and four rigid protrusions 2 as well as a central protrusion 5. The cleat 10 is manufactured from a polyurethane material by "forced extraction molding."

The features of the securing means 4 may be identical with those of the previous cleats 10. It is equally possible to utilize another type of securing means 4. Two engagement indentations 8 are also provided to be used for securing the cleat 10 onto a shoe sole (not shown). The securing means 4 is reinforced with a metallic pin (not shown).

Both flexible protrusions 1 and rigid protrusions 2 extend downwardly and outwardly at 66.9 degrees with a horizontal plane. Each flexible protrusion 1 is provided with two through grooves 6 in this embodiment, while the rigid protrusions 2 are provided with none. These through grooves 6 will tangle with grass blades and stalks and additionally provide grips on grass.

The rigid protrusions 2 are shorter than the flexible protrusions 1 and the height of the central protrusion 5 is provided roughly even with that of the deepest portions of the through grooves 6.

Figure 10:
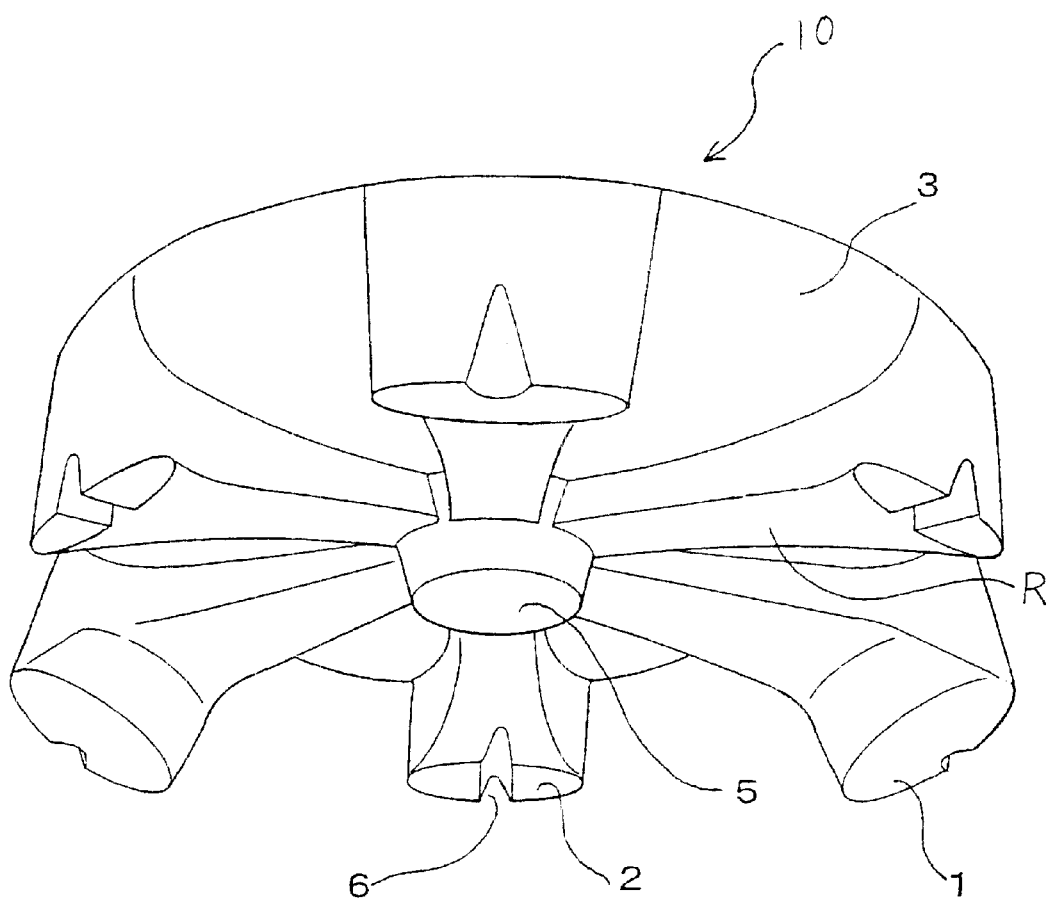
FIG. 10 is a perspective view of a cleat 10 according to yet another embodiment (No. 4) of the present invention.

The plastic cleat 10 shown in FIG. 10 is provided with three flexible protrusions 1 and three rigid protrusions 2. Through grooves 6 are provided on the rigid protrusions 2. The top portions of the voids contacting the bottom side of the cleat body 3 are made "flat" in this embodiment (No. 4).

In order to provide additional grips and bites on grass, ribs R are provided stretching between the flexible protrusions 1 and the central protrusion 5 and between the rigid protrusions 2 and the central protrusion 5, which also provide further rigidity to the cleat 10.

Figure 11:
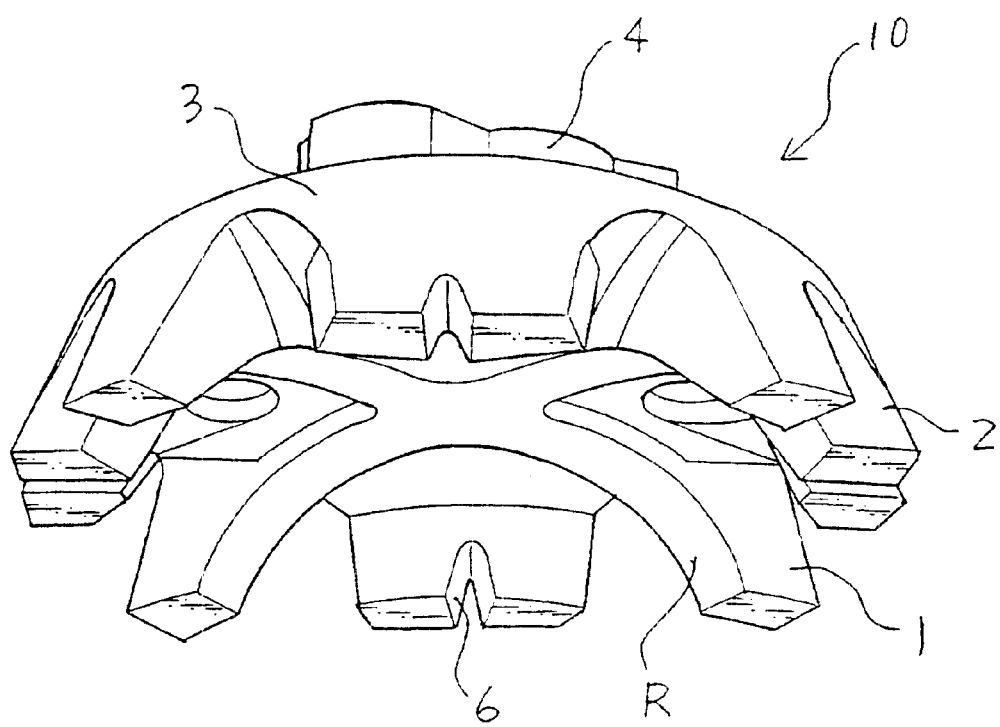
FIG. 11 is a perspective view of a cleat 10 according to still another embodiment (No. 5) of the present invention.
Figure 12:
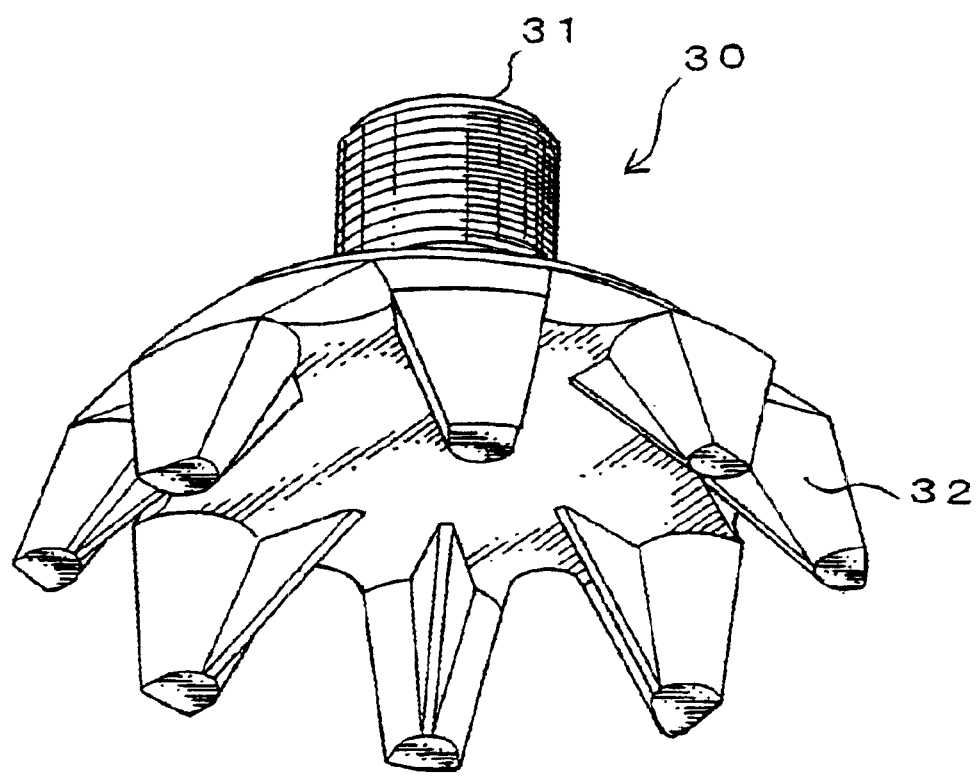
FIG. 12 is a perspective view showing a conventional plastic cleat.
Figure 13:
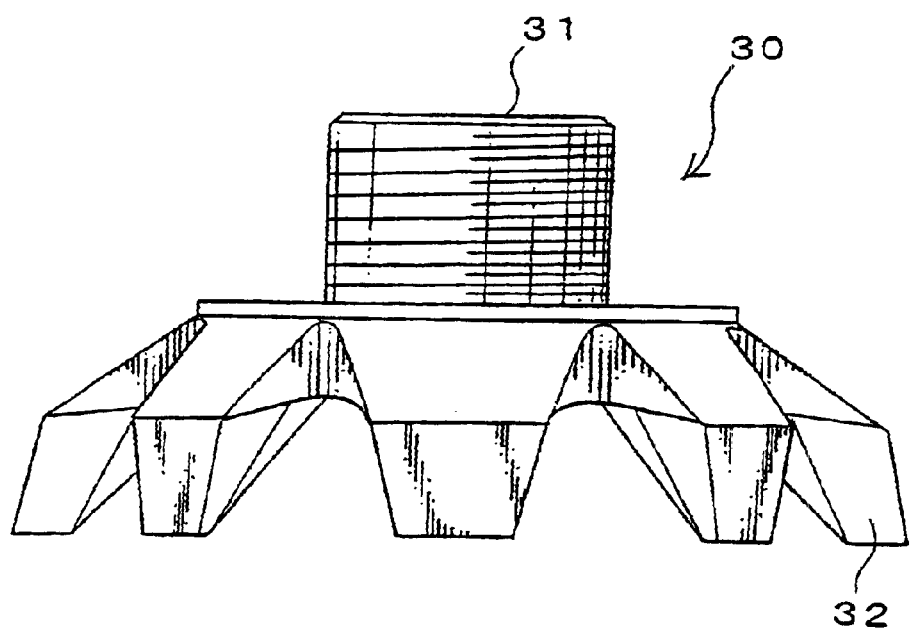
FIG. 13 is a side elevational view of the conventional plastic cleat shown in FIG. 12.
Figure 14:
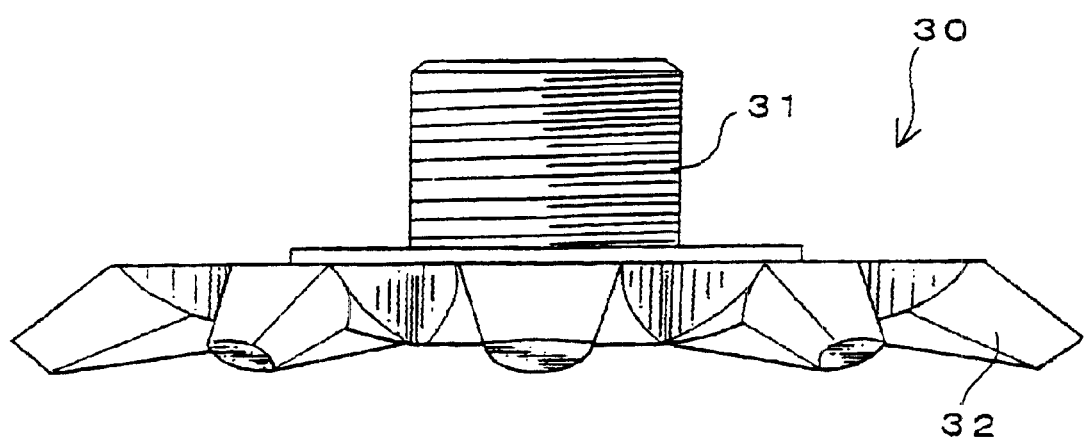
FIG. 14 is a side elevational view of the conventional plastic cleat of FIG. 13 showing an example of deformation.

The plastic cleat 10 shown in FIG. 11 is also provided with ribs R. The ribs R in this embodiment (No. 5) stretch across the bottom side of the cleat body 3 between the flexible protrusions 1 as shown. There is not provided a central protrusion 5 here. The ribs R additionally provide grips and bites on grass as well as reinforcement to the cleat 10.

This invention has been described in connection with various embodiments. It is to be understood that various modifications and changes to the embodiments will occur to persons skilled in the art. For example, "central protrusion 5" can be eliminated from the embodiments (No. 2–4) or the number of "flexible protrusions 1" and/or "rigid protrusions 2" can be changed.

Those modifications and changes should fall within the spirit and scope of the present invention as defined in the attached claims.

What is claimed is:

1. A cleat for a golf shoe comprising:

a cleat body;

a plurality of flexible protrusions provided on a side of said cleat body; and a plurality of rigid protrusions provided on said side of said cleat body, wherein said rigid protrusions are shorter than said flexible protrusions, and said flexible protrusions and said rigid protrusions are provided alternately.

2. A cleat according to claim 1, further comprising a central protrusion provided on said cleat body to assist said rigid protrusions in supporting weight resting on said cleat.

3. A cleat for a golf shoe comprising:

a cleat body;

a plurality of flexible protrusions provided on a side of said cleat body, said flexible protrusions obliquely extending outwardly; and a plurality of rigid protrusions provided on said side of said cleat body, said rigid protrusions being shorter than said flexible protrusions, wherein said flexible protrusions and said rigid protrusions are provided alternately, each void created between said flexible protrusions and said rigid protrusions being sufficiently large so as to prevent its getting stuffed with mud, whereby said rigid protrusions chiefly support weight resting on said cleat when said flexible protrusions have bent outwardly on a hard surface.

4. A cleat for a golf shoe comprising:

a cleat body to be detachably received within receptacle means provided on a golf shoe sole;

a plurality of flexible protrusions provided on a side of said cleat body; and a plurality of rigid protrusions provided on said side of said cleat body, said rigid protrusions being shorter than said flexible protrusions, wherein said flexible protrusions and said rigid protrusions are provided alternately, whereby said rigid protrusions chiefly support weight resting on said cleat when said flexible protrusions have bent outwardly on a hard surface.

5. A cleat according to claim 4, wherein each of said rigid protrusions is provided with a through groove on the free end portion thereof.

6. A cleat for a golf shoe comprising:

a cleat body;

securing means provided on a first side of said cleat body, said securing means to be detachably secured on a golf shoe sole;

a plurality of flexible protrusions provided on a second side of said cleat body, said flexible protrusions obliquely extending outwardly; and a plurality of rigid protrusions provided on said second side of said cleat body, said rigid protrusions being shorter than said flexible protrusions, wherein said flexible protrusions and said rigid protrusions are provided alternately, each void created between said flexible protrusions and said rigid protrusions being sufficiently large so as to prevent its getting stuffed with mud, whereby said rigid protrusions chiefly support weight resting on said cleat when said flexible protrusions have bent outwardly on a hard surface.

7. A plastic cleat for a golf shoe comprising:

a cleat body;

securing means provided on a first side of said cleat body, said securing means to be detachably secured on a golf shoe sole;

a plurality of flexible protrusions provided on a second side of said cleat body, said flexible protrusions obliquely extending outwardly; and a plurality of rigid protrusions provided on said second side of said cleat body, said rigid protrusions being shorter than said flexible protrusions, wherein said flexible protrusions and said rigid protrusions are provided alternately, whereby said rigid protrusions chiefly support weight resting on said cleat when said flexible protrusions have bent outwardly on a hard surface, wherein the oblique outward projection of said flexible protrusions from said cleat body is restricted within a limit which facilitates utilization of forced extraction molding.

8. A plastic cleat for a golf shoe comprising:

a cleat body;

securing means provided on a first side of said cleat body, said securing means to be detachably secured on a golf shoe sole;

a plurality of flexible protrusions provided on a second side of said cleat body, said flexible protrusions obliquely extending outwardly; and a plurality of rigid protrusions provided on said second side of said cleat body, said rigid protrusions being shorter than said flexible protrusions, wherein said flexible protrusions and said rigid protrusions are provided alternately, whereby said rigid protrusions chiefly support weight resting on said cleat when said flexible protrusions have bent outwardly on a hard surface, wherein the oblique outward projection of said flexible protrusions from said cleat body is restricted within a limit which facilitates utilization of forced extraction molding, assisted by voids created between said flexible protrusions and said rigid protrusions.

9. A method for producing a plastic cleat for a golf shoe, comprising:

preparing a mold having an extraction opening for a plastic cleat which comprises a cleat body, securing means provided on a first side of said cleat body, a plurality of flexible protrusions provided on a second side of said cleat body, said flexible protrusions obliquely extending outwardly, and a plurality of rigid protrusions provided on said second side of said cleat body, said rigid protrusions being shorter than said flexible protrusions, said flexible protrusions and said rigid protrusions being provided alternately, wherein said extraction opening is narrower than the widest portion of said cleat;

injecting a plastic material into said mold, and letting the plastic material half harden in said mold;

forcedly extracting the half hardened material from said mold through said extraction opening before said material gets completely hardened within said mold; and leaving the extracted material to rebound to the designed cleat shape outside said mold.

* * * * *